United States Patent [19]

Lee

[11] Patent Number: 4,956,423

[45] Date of Patent: Sep. 11, 1990

[54] HOT-MELT ADHESIVES

[75] Inventor: Chung J. Lee, Amherst, N.Y.

[73] Assignee: Occidental Chemical Corporation, Niagara Falls, N.Y.

[21] Appl. No.: 792,430

[22] Filed: Oct. 29, 1985

[51] Int. Cl.$^5$ .............................................. C08L 77/00
[52] U.S. Cl. .................... 525/432; 525/420.5; 525/421; 525/434
[58] Field of Search ............ 525/432, 434, 420.5, 525/421

[56] References Cited

U.S. PATENT DOCUMENTS

| | | | |
|---|---|---|---|
| 4,297,454 | 10/1981 | Thompson | 525/432 |
| 4,346,200 | 8/1982 | Woodbrey | 525/432 |
| 4,409,373 | 10/1983 | Wiemers | 525/432 |

FOREIGN PATENT DOCUMENTS

| | | | |
|---|---|---|---|
| 738308 | 3/1970 | Belgium | 525/432 |
| 00145757 | 11/1980 | Japan | 525/432 |
| 0147848 | 11/1981 | Japan | 525/432 |

Primary Examiner—Ana L. Carrillo
Attorney, Agent, or Firm—James F. Tao; James F. Mudd

[57] ABSTRACT

Improved hot melt adhesives comprise a blend of a polyamide and a polyetheramide. The polyamides have the following general structure

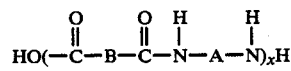

wherein A is a linear, branched or cyclic aliphatic hydrocarbon radical, which can be substituted with a halogen such as chlorine or bromine, when fire retardant products are desired, and wherein B is a linear or branched, saturated or unsaturated, aliphatic hydrocarbon radical, which can be substituted with halogen such as chlorine or bromine when fire retardant products are desired. The polyamides can also contain a residue of a saturated aliphatic hydrocarbon dicarboxylic acid. The value of x of the polymer formula is generally in the range of 5 to about 500, more usually in the range of about 20 to about 100. The polyetheramides have the following general structure:

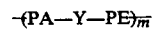

wherein PA represents a polyamide segment and PE represents a polyether segment, m is an integer ranging from 5 to about 100, Y is a group selected from

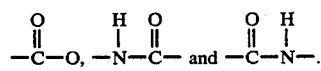

The compositions of the invention can further include polyphenol compositions and pigments. The compositions are useful as hot melt adhesives or sealants. They retain their useful properties at very low temperatures, as low as −40° C.

15 Claims, No Drawings

HOT-MELT ADHESIVES

BACKGROUND OF THE INVENTION

Various adhesive compositions have been used to adhere substrates. Compositions used in the art include water-borne adhesives, solvent borne adhesives and hot melt adhesives. Hot melt adhesives are advantageous because they are non-polluting as compared to solvent based systems, and do not require evaporation of water as in water based systems. Hot melt adhesives, based on thermoplastics have proven useful in assembly line applications where speed is essential, but the known systems have proven to have disadvantages.

Commercial hot melt adhesives based on polyamides have limited low temperature capacity. For instance, polyamides such as Nylon 6 and Nylon 6–12 have glass transition temperatures of about 65° C. and 45° C., respectively. These polyamides become brittle at temperatures below 0° C. They are therefore excluded from bonding applications, for instance in automotive and refrigeration applications, where flexibility of adhesives at temperatures as low as −40° C. is required. Polyamides derived from a dimerized fatty acid monomer can extend the low temperature capacity further, however, they are usually limited to temperatures as low as −20° C. In addition, these kinds of polyamides usually have low adhesion strength and fail undesirably under loads by the adhesive failure mode. (This means that failure occurs at the interface between the substrate and the adhesive.) An example of such a polyamide adhesive is disclosed in European Patent Publication EP 46968 dated Mar. 10, 1982. The disclosed polyamide is made by polymerizing dimerized fatty acids with diglycolamine and other compounds.

Polyetheramide block copolymers with useful application temperatures (−40° C. to 150° C.) usually have very high melt viscosities ($\approx$9,000 poise at 200° C.) and are not applicable as hot melt adhesives due to the limitations of the capacity of hot melt dispensing systems. Commercial hot melt dispensing systems generally cannot handle materials having viscosities greater than 1000 to 2000 poises. Hot melt adhesives with dispersing temperatures higher than 200° C. are not suitable to bind many thermoplastic substrates, such as polycarbonate, and the like. Thus, the foregoing polyetheramides are not known as adhesives.

Belgian Pat. No. 891,543 discloses a polyetheramide said to be a hot melt adhesive which can be used to bond aluminum to aluminum. However, the molecular weight of the polymer is reported to be 1000. Such a polyetheramide is distinctive from the polyetheramides contemplated with respect to the present invention which have molecular weights greater than 10,000, on the order of 15,000 to 30,000.

Other attempts at utilizing the polyetheramides in hot melt compositions appear in French Patent No. 2,533,577, which discloses a complex mixture of components including a polyetheramide, but also including butyl rubber, a terpene-phenolic resin, an ethylene vinyl acetate copolymer, a polyisobutylene and polypropylene. There is no disclosure or suggestion to use a polyamide in the mixture. Similarly, French Patent No. 2,523,143 discloses a mixture of a polyetheramide with a vinyl ester polymer, but does not suggest the use of a polyamide.

Other references which disclose a polyetheramide and make tangential references to a polyamide include Japanese Kokai 60/960 dated Jan. 7, 1985, which discloses tubes having separate layers of a polyetheramide and a polyamide, but which do not disclose any admixture of the two types of polymers. A related disclosure is found in Japanese Kokai 59/129137 dated July 25, 1984. A polyetheramide is used as a carrier for a dye in improving the dyeing characteristics of polyamide fibers, in Research Disclosure, Volume 229, pages 175 to 176, (published in the United Kingdom by Kenneth Mason Publications, Ltd.)

Therefore, one objective of the present invention is to develop hot melt adhesives which can be processed or dispensed using commercially available hot melt systems. Another objective of the present invention is to provide a hot melt adhesive which has a higher adhesive strength and a reliable adhesion failure mode (cohesive failure mode). This means that the failure occurs within the body of the adhesive, and is the preferred mode of failure, compared to the adhesive failure mode. Furthermore, another objective of the present invention is to make a hot melt adhesive which has good oil resistance for automotive under the hood applications.

SUMMARY OF THE INVENTION

The improved hot melt adhesives of the invention comprise a blend of a polyamide and a polyetheramide, also referred to as a polyetheramide block copolymer and a polyether block amide.

The polyamides have the following general structure

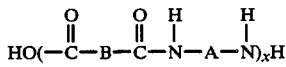

wherein A is a linear, branched or cyclic aliphatic hydrocarbon radical and B is a linear or branched, saturated or unsaturated, aliphatic hydrocarbon radical, and X is 5 to about 500.

The polyetheramides have the following general structure:

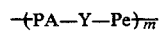

wherein PA represents a polyamide segment and PE represents a polyether segment, m is an integer in the range from 5 to about 1000, and Y is a group selected from

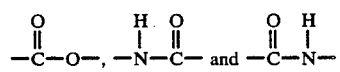

The compositions of the invention can further include polyphenol compositions and pigments.

The compositions are useful as hot melt adhesives or sealants. They retain their useful properties at very low temperatures, as low as −40° C.

DISCLOSURE OF EMBODIMENTS

The polyamides employed in the present invention have the following general structure:

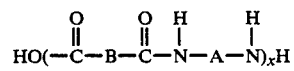

wherein A is a linear, branched or cyclic, aliphatic hydrocarbon radical, which can be substituted with a halogen such as chlorine or bromine, when fire retardant products are desired, and wherein B is a linear or branched, saturated or unsaturated hydrocarbon radical, which can be substituted with halogen such as chlorine or bromine when fire retardant products are desired. The polyamides can also contain a residue of a saturated aliphatic hydrocarbon dicarboxylic acid.

The value of x of the polymer formula is dictated by the chemical structure of the polyamide and the desirable melting temperatures for specific applications, which temperatures are generally in the range of about 40° C. to about 260° C., preferably from 100° C. to about 200° C. The molecular weight or the repeating unit is therefore controlled to provide a polyamide having a melt viscosity of about 10 to not more than 1000 poise at low shear rate (about 1 second$^{-1}$) and at temperatures below 240° C. in order to facilitate the melt dispensing application. Higher viscosity and temperature ranges will be possible when the capacity of hot melt dispensing equipment in the future can handle wider range of processing conditions (higher temperatures and higher viscosity). The value of x is generally in the range of 5 to about 500, more usually in the range of about 20 to about 100.

The polyamides are reaction products of a dicarboxylic acid and a diamine. The dicarboxylic acids have the general formula

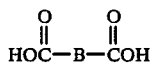

wherein B is a linear or branched, saturated or unsaturated aliphatic hydrocarbon radical of 2 to about 40 carbon atoms, preferably about 16 to about 40 carbon atoms. The preferred dicarboxylic acids are referred to as acid dimers. The acid dimers are prepared from fatty acids by dimerization of unsaturated fatty acid molecules of about 8 to about 20 carbons to produce the corresponding difunctional acids of about 16 to about 40 carbon atoms. Suitable acid dimers are prepared from fatty acids such as Z-9-octadecenoic acid, Z,Z-9,12-octadecadienoic acid and Z,Z,Z-9,12,15-octadecatrienoic acid, also known as linoleic acid.

Optionally, a saturated aliphatic hydrocarbon dicarboxylic acid of the formula

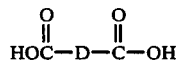

can be included in the composition. D can be a saturated, preferably linear, aliphatic hydrocarbon radical of 1 to about 12 carbon atoms or an aryl radical such as a phenyl radical. Suitable acids of this type include ethanedoic acid, hexanedoic acid, nonanedoic acid, decanedoic acid and isophthalic or terephthalic acid.

The diamines have the general formula H$_2$N A NH$_2$ wherein A is a linear, branched or cyclic aliphatic hydrocarbon radical, which generally contains 2 to about 40 carbon atoms, preferably about 20 carbon atoms. Suitable diamines include 1,2-ethanediamine; 1,2-propanediamine; triethylene diamine; diglycol amine; 1,6-hexanediamine; 4,8-tridecadiene-1,11-diamine; N-(2-aminoethyl)-1,2-ethane diamine; and 2,2,12-trimethyl-4,8-tridecadiene-1,11-diamine.

The foregoing polyamides and reacting components are disclosed in European Patent Publication EP 46968, Japanese Kokai 58/134,122 and Germany Offenlegungsschrift DE 3,222,528, the disclosures of which are incorporated herein by reference. The foregoing polyamides are commercially available under the tradenames Macromelt sold by Henkel Corporation and Versamid, Versalon and Milvex sold by General Mill Chemicals.

The polyetheramides of the present invention have the following general structure:

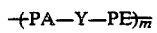

wherein PA represents a polyamide segment and PE represents a polyether segment, and m is an integer from 5 to about 100, preferably about 10 to about 50.

The polyetheramides are prepared by reacting a polyamide with a polyether. The polyamides can be terminated with carboxylic acid groups or with amino groups. The polyethers can be terminated with hydroxyl groups or carboxylic acid groups. The end groups of any pair of compounds to be joined must be chosen such that they will react. Thus amino and hydroxyl groups can be reacted with carboxyl groups. Alternatively, a small difunctional molecule can be used to react together two reactive end groups that are not reactive with each other. Such a small difunctional compound can be adipic acid used, for example, to react an amino group of a polyamide with a hydroxyl group of a polyether. In any event, the result of such reactions is a functional group Y which bridges the polyamide segment PA and the polyether segment PE. The Y groups can have the formulas:

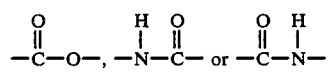

The polyether of the present invention has a general structure of the following.

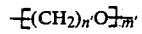

wherein n' is an integer from 1 to 10, preferably no more than 5, and m' is an integer from 5 to about 1,000, preferably up to about 200. The molecular weight of the polyether segment is generally in the range of about 400 to 5000 to provide a low glass transition point of less than −20° C. Suitable polyethers are the polyalkylene glycols, also known as polyoxyalkylene glycols, such as, polyethylene glycol, polypropylene glycol, polytetramethylene glycol, and hydroxyl terminated poly(tetrahydrofuran).

From the description of the polyamide component of the blend of the invention, the chemical structure of the polyamide of the present invention is selected from materials which preferentially have a longer (>about 16 carbon) aliphatic chain length and preferably with some branching to provide a polyamide with a low melt temperature and low melt viscosity. By contrast, the polyamide segment of the polyetheramide, PA, is selected from materials which have a shorter (<3-12 carbon) chain length and more regular, non-branched aliphatics, in order to achieve a polyamide having a higher melting temperature. The polyamide segments of the polyetheramide can be prepared by opening the ring of lactam compounds such as ε-caprolactam, dodecalactam or laurolactam, in a catalytic reaction or by reacting 1,6-hexanediamine with dodecanediodic acid, and the like. 1-amino dodecane acid can also be employed.

The polyetheramides can be prepared by reacting the polyamide components and polyether components in the presence of a polycondensation catalyst such as zinc oxide, stannous oxide, $Zr(OP)_4$, $Ti(OBu)_4$, $H_3PO_4$, and the like, and optionally in the presence of small difunctional molecules such as adipic acid.

The total weight percent of the polyamide segment is in general at least of 30 weight percent, or preferably, 50 weight percent up to about 85 weight percent of the polyetheramide in order to provide a block copolymer with high melting temperature (>120° C.) and thermal stability for automotive under the hood applications. The polyetheramides of the invention have a number average molecular weight greater than about 10,000, preferably about 15,000 to about 30,000. Low molecular weight (<2000) polyetheramide copolymers with low melting temperatures and low melt viscosity can only be used as a hot melt adhesive; where thermal stability and temperature requirements (−40° C. to 120° C.) are not critical. For instance, a polyetheramide of molecular weight 1000 as described in the aforementioned Belgian Patent 891543 is not suitable for the present invention. Not only can it not fulfill the temperature requirement, but also due to its very low oil resistance. It can be seen in Table 1 that even the high molecular weight (>16,000) Polymer B, which is a polyetheramide, has a rather poor oil resistance as compared to the polyblends of the present invention.

The preparation of the polyetheramides is disclosed in German Offenlegungsschrift DE 3,428,404; 2,936,977 and 2,932,234; European Patent Application EP 132,131; U.S. Pat. No. 4,331,786 and Belgian Pat. 885,480, the disclosures of which are incorporated herein by reference.

The proportions of the polyamide to polyetheramide can vary from about 1 to 99 weight percent polyamide based on the total weight of polyamide and polyetheramide, preferably about 20 to 80 weight percent, and still more preferably about 40 to 60 weight percent, depending on the melt viscosity and properties desired for particular applications.

Optionally, the present invention also employs a polyphenol compound of the following general structure:

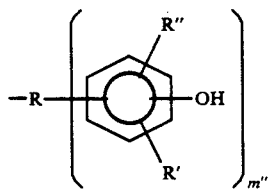

wherein R can be any known bridging functional group, such as a difunctional ($CH_2$) radical such as in the phenolic resoles and novolacs; or a group having the formula

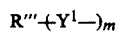

wherein $Y^1$ is an organic diradical containing a bridging group Y, such as shown in the above polyetheramide structure.

In the foregoing formulas, m has a value of 1 to 4. R' and R" is individually a substituted or non-substituted aliphatic hydrocarbon monoradical, whereas the R''' is an organic m-radical.

The polyphenol employed in the present invention serves many functions such as an antioxidant, an adhesive tackifier or plasticizer, and the like. The polyphenol is employed in the range of about 0.1 to about 5 percent based on the polyblend consisting of polyamide and polyetheramide.

In order to match the color of the adhesives to the substrates employed for bonding, pigments can also be used. The percent of the pigment used ranging from about 0.01 up to about 5 percent of the polyblend of the present invention.

The preparation of the hot melt adhesives of the present invention can be easily achieved by melt blending of the polyamide with the polyetheramide, preferably in an extruder. Other melt plasticating facilities can also be used to blend the two ingredients into a homogeneous product and can certainly be used for compounding. Normally the compounding temperatures range from the melting temperature of a low melting ingredient to temperatures of no more than 260° C. at which substantial amide exchange becomes apparent, especially when the residence time is more than a few minutes. Amide exchange is not undesirable, because quality control can become a problem and therefore should be avoided.

The hot melt adhesives of the invention are used to bond any two or more substrates that do not distort under the influence of 200° C. temperature. Suitable substrates include metals such as steel, copper, aluminum, and the like; thermoplastics, such as polyethylene terephthalate, polybutylene terephthalate, polyarylates, polycarbonates and other engineering thermoplastics, and thermosetting resins such as phenolic resins, epoxy resins, melamine resins, crosslinked polyethylene, and the like. Suitable applications include sealing electrical connectors into fixtures.

The following examples are given to further illustrate the invention, but are not intended to limit it. Unless otherwise indicated in this specification and claims, all parts are by weight and temperatures are degrees Celsius.

EXAMPLE 1

A blend was made of the following two materials:

Polymer A was a polyamide sold under the tradename MACROMELT 6211 by Henkel Corporation. The polymer had an incipient melting temperature of about 145° C. as measured by differential thermal analysis at 10° C./minute heating rate. The polyamide had a 32 poise melt viscosity at 200° C. and 1 second$^{-1}$ shear rate. Dynamic mechanical analysis showed the polyamide had a tan δ peak temperature at about 0° C., which is considered to be the glass transition temperature or the lower limit flexible temperature of the material.

Polymer B was a polyetheramide block copolymer sold under the tradename PEBAX 2533 by Atochimie, which comprised about 50% of the polyether segment (PE). The block polymer had a melting temperature of about 148° C. as measured according to ASTM D789 method. The polymer had a melt viscosity of 16,000 poise at 200° C. and 1 second$^{-1}$ shear rate as measured by capillary viscometer.

Preparation of Blend

To a hot mill roller operating at 170° C., was added 200 grams of polymer B which melted on the roller. Then was slowly added 200 grams of polymer A which also melted on the roller. The resulting melted material was stripped off the roller and then re-melted on the roller for 3 or 4 times during the time period of about 3 minutes to insure a homogeneous product.

The properties of the starting materials and the final blend of polymers A and B were evaluated and are shown in Table 1.

The data in Table 1 show that the blend of the invention has a melt viscosity that makes it very useful for application as a hot melt adhesive in commercially available equipment. By contrast, the melt viscosity of polymer B is so high that it would be very difficult to process in commercially available equipment. Referring to the adhesion data, polymer A had adhesion strengths of 100 to 300 lbs/square inch and Polymer B had adhesion strengths of 220 and 330. But what is significant is that the bonds using polymers A and B broke by adhesive failure, in which the bond between the adhesive and substrate fails. By comparison, the bonds made with the composition of the invention failed by "cohesive failure", in which the break occurs in the body of the adhesive. The latter mode of failure is preferred in commercial practice because it is deemed to be a more reliable or predictable form of failure.

Further in Table 1, the composition of the invention was found to be vastly superior to polymer B with respect to oil resistance as measured as a function of dimensional change, and with respect to Polymer A when tensile strength and retention of strength were determined. Thus, the blend of the invention exhibited a synergistic improvement in oil resistance.

amide and the polyetheramide were varied as shown in Table 2. For each polyblend the melt viscosity was determined at 200° C./1 second[1]. The melt viscosities are shown in Table 2.

TABLE 2

| Experiment | Proportions, Weight Percent | | Melt Viscosity Poises at 200° C. |
|---|---|---|---|
| | Polymer A | Polymer B | |
| I | 30 | 70 | 5600 |
| II | 40 | 60 | 4000 |
| III | 70 | 30 | 590 |

EXAMPLE 3

To the polymer blend of Example 1 were added carbon black and a polyphenol sold by Ciba-Geigy under the trade name IRGANOX 1010, which has the following formula

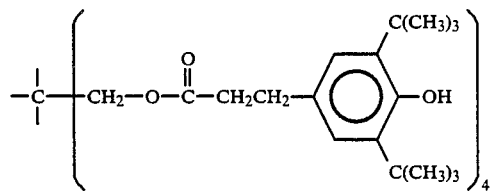

The proportions of the polymers and additives are shown in Table 3. The compositions were compounded using a twin screw extruder which had barrel zone temperatures of 145° C. (zone 1), 140° C. (zone 2), 125° C. (zone 3), 115° C. (zone 4), 115° C. (zone 5) and 115° C. (die) at 120 revolutions per minute. The oil resistance in terms of the percent dimensional increment was determined for each of the compositions, including con-

TABLE 1

| Test | Conditions | Blend of Example 1 | Polymer A | Polymer B |
|---|---|---|---|---|
| Melt viscosity Poise at 200° C. | | 1000 | 32 | 16,000 |
| Adhesion Strength lap shear tensile strength, psi (ASTM C961) | 1. Alclad Aluminum | 310-⊕ | 300* | 220* |
| | 2. Ground steel | 330-⊕ | 100* | 330* |
| | 3. Polyester molded part | 260-⊕ | 170* | ** |
| Oil Resistance dimensional increment, percent | 1. G.M. Steering oil /100° C./72 hours | 5.5 | 10.0 | 12.5 |
| | 2. G.M. Brake oil /50° C./72 hours | 10.2 | 15.0 | 23.1 |
| | 3. ASTM #3 oil /100° C./72 hours | 11.0 | 11.0 | 25.0 |
| Tensile Strength (psi) and percent retention after oil immersion | 1. G.M. Steering oil /100° C./72 hours | 417 (67%) | 0 (0%) | |
| | 2. G.M. Brake oil /50° C./72 hours | 206 (33%) | 0 (0%) | |
| | 3. ASTM #3 oil /100° C./72 hours | 246 (40%) | 0 (0%) | |
| Percent at Water Absorption 50° C./72 hours | | 3.50 | 4.30 | 2.40 |

FOOTNOTES:
⊕Cohesive failure
*Adhesive failure
**Not available, because the adhesive could not be used without distorting the polyester molding.
Viscosity measured at a shear rate of 1/second $^{-1}$
Too difficult to mold

EXAMPLE 2

Additional polyblends were prepared in accordance with Example 1 except that the proportions of the polytrol blend III. The results are shown in Table 3.

TABLE 3

| Experiment | Proportions, Weight Percent | | Weight Percent Additives Based on Blend | | Oil Resistance Dimensional Increment, Percent ASTM No. 3 Oil 105° C./72 Hours |
|---|---|---|---|---|---|
| | Polymer A | Polymer B | Polyphenol | Carbon Black | |
| I | 50 | 50 | 0.25 | 0.1 | 15.5 |
| II | 50 | 50 | 0.40 | 0.1 | 18.8 |
| III | 50 | 50 | 0 | 0 | 17.0 |

I claim:

1. A hot melt adhesive composition comprising a blend of a polyamide and a polyetheramide, wherein the polyamide has the formula

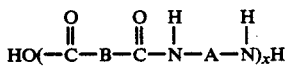

wherein A is a linear, branched or cyclic aliphatic hydrocarbon radical and B is a branched, saturated or unsaturated, aliphatic hydrocarbon radical, and x is 5 to about 500;and wherein the polyetheramide has the formula

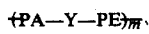

wherein PA represents a non-branched polyamide segment and PE represents polyether segment, m is an integer in the range from 5 to about 100, Y is a group selected from

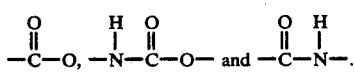

2. The composition of claim 1 comprising about 20 to 80 parts by weight of polyamide per 100 parts by weight of the polyamide and the polyetheramide.

3. The composition of claim 1 comprising about 40 to 60 parts by weight of polyamide per 100 parts by weight of the polyamide and the polyetheramide.

4. The composition of claim 1 wherein B is a branched, unsaturated, aliphatic hydrocarbon radical having a chain length of about 16 to about 40 carbon atoms.

5. The composition of claim 4 wherein A is a linear aliphatic hydrocarbon radical having a chain length of about 2 to about 20 carbon atoms.

6. The composition of claim 5 which also contains residues of a saturated aliphatic hydrocarbon dicarboxylic acid.

7. The composition of claim 1 wherein the polyether segment has the formula

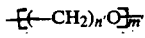

wherein n' is an integer from 1 to 10, and m' is an integer from 5 to about 1000.

8. The composition of claim 7 wherein the polyamide segment is produced by ring opening a lactam compound.

9. The composition of claim 1 also comprising a pigment.

10. The composition of claim 1 wherein the polyamide is the reaction product of components comprising a dicarboxylic acid having the formula HOOCB-COOH wherein B is a branched, saturated or unsaturated aliphatic hydrocarbon radical of about 16 to about 40 carbon atoms, and a diamine having the formula $H_2N$ A $NH_2$ wherein A is a linear, branched or cyclic aliphatic hydrocarbon radical having 2 to about 20 carbon atoms.

11. The composition of claim 10 which also contains a dicarboxylic acid having the formula HOOC D COOH wherein D is a saturated aliphatic hydrocarbon radical of 1 to about 12 carbon atoms, or an aryl radical.

12. The composition of claim 1 wherein the polyetheramide is the reaction product of a polyether and a non-branched polyamide, said polyetheramide having a number average molecular weight greater than 10,000.

13. The composition of claim 15 wherein the polyether contains the structure

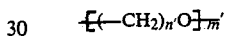

wherein n' is an integer from 1 to 5 and m' is an integer from 5 to about 200.

14. The composition of claim 13 wherein the polyamide is formed by catalytically opening a lactam compound.

15. A hot melt adhesive composition comprising a polyamide of the formula

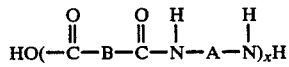

wherein A is a linear, branched or cyclic aliphatic hydrocarbon radical and B is a branched, saturated or unsaturated, aliphatic hydrocarbon radical, and x is 5 to about 500 and a polyetheramide having the formula

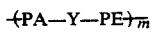

wherein PA represents a non-branched polyamide segment and PE represents a polyether segment, m is an integer in the range from 10 to about 50, Y is a group selected from

the polyamide is present in a proportion of about 20 to 80 parts by weight based on 100 parts by weight of the polyamide and the polyetheramide.

* * * * *